United States Patent

[11] 3,598,144

| [72] | Inventor | Robert A. Hodgson<br>1420 East 37th, Tulsa, Okla. 74105 |
|---|---|---|
| [21] | Appl. No. | 882,537 |
| [22] | Filed | Dec. 5, 1969 |
| [45] | Patented | Aug. 10, 1971 |

[54] MULTIPOINT LIQUID LEVEL CONTROLLER
6 Claims, 7 Drawing Figs.

[52] U.S. Cl. .................................................. 137/392,
137/403
[51] Int. Cl. ...................................................... G05d 9/12
[50] Field of Search ........................................... 137/386,
389, 392, 403, 614.02; 73/302

[56] References Cited
UNITED STATES PATENTS
1,981,530  11/1934  Thomas ........................ 137/392

2,593,587  4/1952  Marcus ........................ 73/302
FOREIGN PATENTS
381,569  10/1932  Great Britain ............... 137/392
466,765  7/1950  Canada ....................... 137/392

Primary Examiner—M. Cary Nelson
Assistant Examiner—David R. Matthews
Attorney—Head & Johnson ABSTRACT: In a controller for governing the liquid level in a tank, electrical conductors adjustably inserted within the tube of a manometer and the manometer fluid thereof are electrically interconnected to form a single pole sequentially operating electrical switch which controls the energization of a pump or other means to control the liquid level within a tank.

PATENTED AUG 10 1971

INVENTOR.
ROBERT A. HODGSON

BY
Head & Johnson
ATTORNEYS

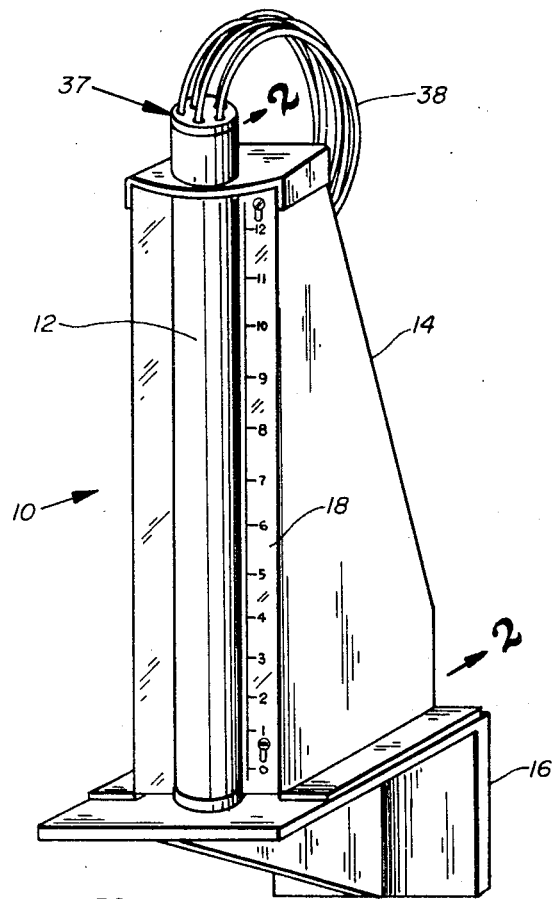
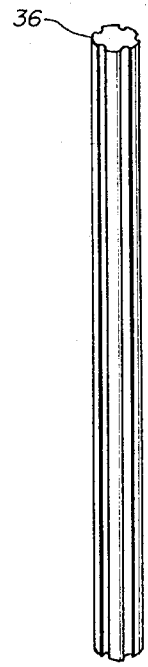
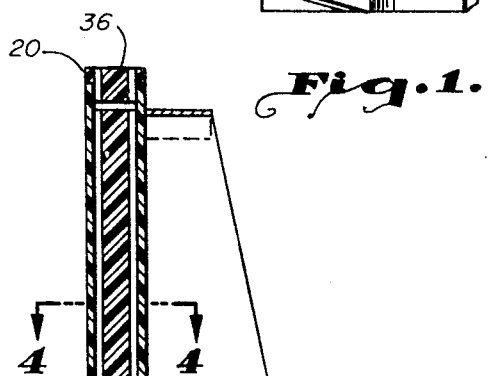
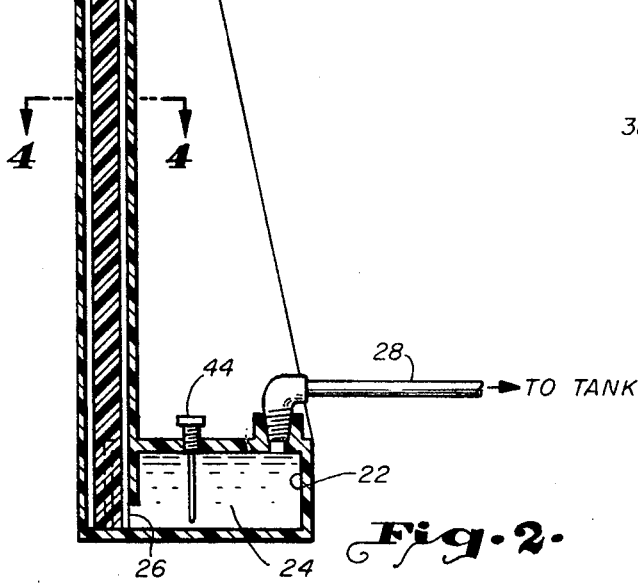
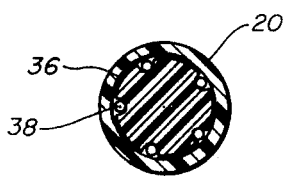
Fig. 1.
Fig. 2.
Fig. 3.
Fig. 4.
INVENTOR.
ROBERT A. HODGSON
BY Head & Johnson
ATTORNEYS 3,598,144

1

MULTIPOINT LIQUID LEVEL CONTROLLER

BACKGROUND OF THE INVENTION

This invention relates to an apparatus for controlling the liquid level within a tank, and more particularly this invention relates to a liquid level controller which utilizes a manometer for sensing the liquid level within a tank and for energizing circuitry to control the liquid level therein.

Heretofore apparatuses employing a manometer have been invented to control the liquid level within tanks. However, a common disadvantage of present controllers incorporating a manometer as the sensing and switching unit, is that the electrical conductors are rigidly fixed within the manometer tube at specified points along the length thereof, and are not adjustable. Consequently, the range of liquid level differentials within the tank controlled by the apparatus cannot be varied without replacing the manometer in use with a different one having electrical contacts disposed along the length of the tube at points divergent from the one in use, and located for the new desired liquid level differentials. Obviously, this changing of the manometer requires the expenditure of maintenance personnel time in a nonproductive manner. Also, since each manometer will control only one range of tank level differentials, a multitude of manometers must be purchased.

It is therefore an object of this invention to provide a liquid level controller which utilizes a manometer as a sensing and a switching unit and in which the liquid level differential controlled thereby can be easily adjusted.

It is a second object of this invention to provide a liquid level controller which utilizes a manometer as a sensing and switching unit and which incorporates means for visual ascertation of the liquid level in the tank.

SUMMARY OF THE INVENTION

Generally the apparatus consists of a manometer containing an electrical conductive manometer fluid. An electrical insulating core is inserted within the tube of the manometer and has a plurality of flutes thereon in which are received a plurality of electrical conductors positioned at different points along the longitudinal length thereof. The electrical conductors are connected to the control circuitry for a pump or other electrical device, and the manometer fluid is electrically connected to the power source thereof, thereby forming a single pole sequentially operating switch with the manometer fluid as the switching medium.

As the level of the tank rises, the manometer fluid is pushed up the tube and makes contact with the electrical conductors thereby energizing the control circuitry which will start the pump or other electrical means to lower the liquid level in the tank. Since each conductor can be used to start a different pump or other electrical means, multipoint regulation of the liquid level in the tank is obtained. Also, since the position of the ends of the electrical conductors in the flutes can be slidably traveled upwardly or downwardly the liquid level ranges controlled by the device can be easily adjusted.

DESCRIPTION OF THE DRAWINGS

FIG. 1 is a perspective view of the apparatus.

FIG. 2 is a cross-sectional view of the apparatus taken along lines 2—2 of FIG. 1.

FIG. 3 is a view of the fluted core which is an element of the invention.

FIG. 4 is a cross-sectional view of the apparatus taken along lines 4—4 of FIG. 2.

DESCRIPTION OF THE PREFERRED EMBODIMENT

Figure 5:
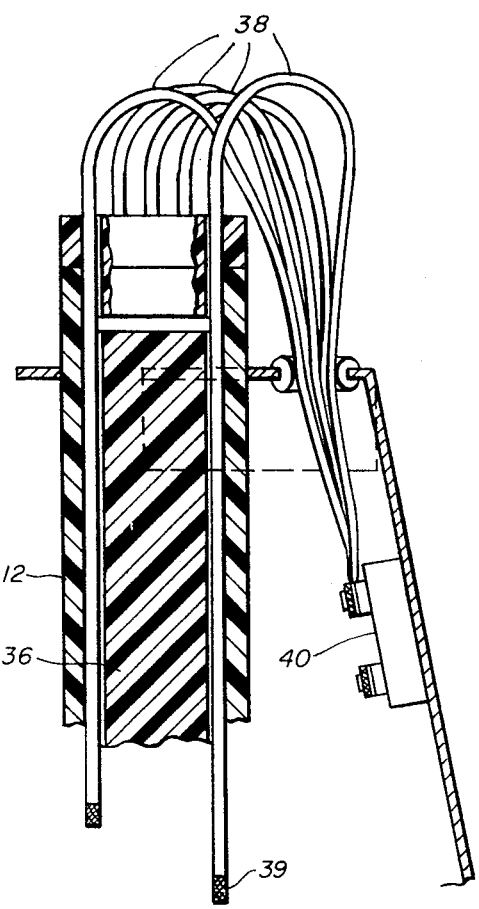
FIG. 5 is a blown up view of the apparatus taken along lines 5—5 of FIG. 2.

The perspective view of FIG. 1 establishes that the apparatus 10 embodies a manometer 12, a support housing 14, a wall-mounting bracket 16, and an indicia registry 18.

Referring now to FIG. 2, the manometer, employed in the invention being of the type commonly used in the industry, includes a vertical manometer tube 20 and a reservoir 22 filled with an electrically conducting menisci fluid 24 such as mercury which is communicable into and from the manometer tube through a port 26. The reservoir through conduit 28 is in pressure communication with a tank (not shown) holding the liquid whose level is to be controlled.

Figure 7:
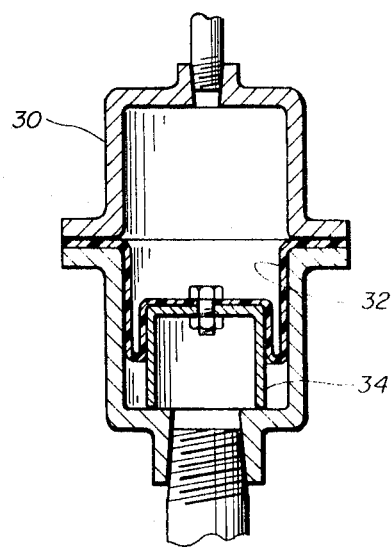
FIG. 7 is a cross-sectional view of the transmitter coupling which is an element of the invention.

If the tank contains corrosive fluid which would contaminate the menisci fluid 24 or be harmful to the manometer materials, a transmitter coupling 30 such as that shown in FIG. 7 may be utilized. The transmitter coupling comprises two chambers separated by a flexible membrane 32. One chamber is filled with an inert liquid which is in communication with the manometer fluid in the manometer reservoir, and the other chamber is in communication with the tank medium. Obviously the pressure undulations exerted on one chamber by the tank medium, that is, the liquid therein, is transferred to the other chamber via the flexing of the membrane and consequentially communicated to the manometer reservoir 22. To facilitate the transference of pressure from one chamber to the other, a travelable piston 34 may be attached to the flexible membrane by suitable means.

Looking at FIG. 3 disposed within the manometer tube 20 is a longitudinally fluted core 36 fabricated from suitable electrically insulator material such as plastic. As clearly shown in FIG. 5, the core 36 fits snugly inside the tube and serves both as a filler reducing the quantity of manometer fluid 24 required to fill the manometer and as an electrical insulator between electrical conductors 38 which are slidably inserted in the flutes thereof through apertures in a cap 37 covering the top of the manometer tube 20. The tips 39 of the electrical conductors 38 disposed within the flutes may be bare copper or the like or in order to increase the electrical rating of the contacts may be specially treated with an arc-resistant, high-melting-point material such as tungsten.

Figure 6:
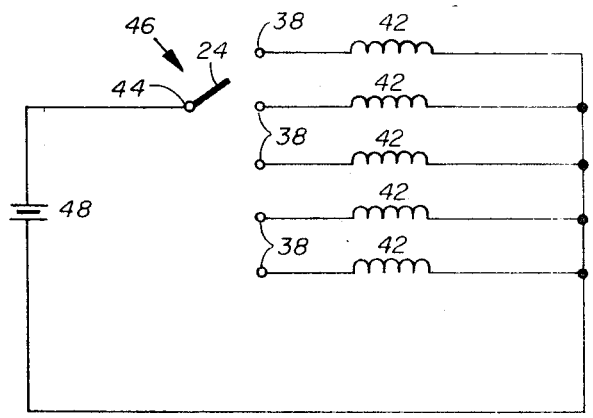
FIG. 6 is an electrical schematic of the apparatus.

The opposite end of the electrical conductors 38 pass into the interior of housing 14 through a grommet and terminate on a terminal board 40 attached to the inner wall of the housing from whence they are electrically connected to the coils of power relays 42 shown schematically in FIG. 6. The contacts of the relays 42 control the energization of the starting circuitry of end devices which in turn control the level of the liquid medium within the tank. The apparatus is especially adapted to control end devices such as electrically controlled motorized valves or pump motors.

Disposed within the reservoir 22 and in communication with the manometer fluid 24 is an electrical anode 44 which cooperates with the electrical conductors 38 to form a single pole sequentially operating electrical switch 46 with the menisci fluid 24 as the switching medium as can best be understood by reference to the schematic of FIG. 6.

A power supply 48 completes the electrical loop and supplies electrical energy to the relay coils 42.

For visual determination of the liquid level, the indicia registry 18 mounted parallel to the manometer tube is calibrated either in feet or metric measurement and is also vertically adjustable for proper zeroing thereof. To further aid visual determination of the height, the fluted core 36 may be of a color contrasting to that of the manometer fluid.

In operation the electrical conductors are disposed within the flutes of the core 36 at various points along the longitudinal length thereof as is necessitated by the desired range of liquid level control. The increase in pressure caused by a rise in the liquid medium within the tank will be communicated to the manometer reservoir through pressure conduit 28 and the manometer fluid will rise upwardly into the manometer tube 20. When the manometer fluid comes in contact with the vertical lowest electrical conductor, coil 42 of the relay electrically connected thereto will become energized thereby activating the corresponding end device and consequentially the liquid medium within the tank will flow therefrom. If the ingress of the liquid into the tank is greater than the egress therefrom, the manometer fluid will continue to rise upwardly within the manometer tube and come in contact with the tips 39 of the remaining conductors 38 causing energization of the other end devices which further increase the outward flow of liquid from the tank.

As the liquid level within the tank falls, the subsequent loss of pressure is communicated to the manometer fluid through conduit 28 causing downwardly contraction thereof from the manometer tube back into the reservoir. As the manometer fluid progressively loses contact with the electrical conductors 38 within the flutes each electrical loop circuit will be independently opened and the corresponding end device will be deenergized.

The desired range of liquid level control can be easily adjusted by simple slidable movement of the electrical conductors relative to the flutes on the core.

During the detailed description of the preferred embodiment specific words have been used for the sake of clarity. However, it is to be understood that the words used are not words of limitation and would include all equivalents which operate in a similar manner to accomplish a similar purpose. As can easily be seen from the description of the preferred embodiment, the number of conductors inserted within the core can be varied to obtain the desired accuracy of liquid level control.

Although the apparatus was described in the preferred embodiment, as controlling end devices which dump the liquid medium within a tank, the apparatus could just as easily be employed to switch end devices controlling the flow of liquid into a tank, or for use as a remote sensor for telemetering tank levels to distant panels stations.

What I claim is:

1. An apparatus for controlling the level of liquid in a vessel comprising:
   a manometer including as an integral part thereof:
      a vertical tubular member, having an open top and a closed bottom and having near the bottom thereof a fluid port;
      a reservoir in pressure communication with said vessel and containing therein an electrically conductive manometer fluid forced into or drawn from said tubular member through said fluid port by pressure undulations communicated to said reservoir from said vessel;
      an elongated electrical insulator core axially inserted in said tubular member of said manometer and having thereon along substantially the length thereof a plurality of longitudinal flutes;
      electrical conductors slidably received in said flutes of said core and having ends positioned at divergent vertical points along the length thereof, the position of said ends of said conductors being individually adjustable along the length of said flutes, said conductors electrically cooperating with said manometer fluid to provide a single pole sequentially operating electrical switch; and
      electrical circuitry for controlling means to adjust the liquid level in said vessel, said circuitry being electrically interconnected to said single pole sequentially operating electrical switch whereby said conductive manometer fluid upon being forced from said reservoir into said tubular member by an increase in pressure communicated to said reservoir from said vessel and making contact with the tips of said electrical conductors received in said flutes triggers said electrical circuitry for controlling means to adjust the liquid level in said vessel.

2. An apparatus as in claim 1 wherein said tubular member has fitted over said open top a cap having a plurality of apertures through which said electrical conductors pass.

3. An apparatus as in claim 1 wherein the ends of said electrical conductors positioned in said flutes are treated with and have thereon an arc-resistant, high-melting-point material.

4. An apparatus as in claim 1 wherein said apparatus has longitudinally disposed laterally of said manometer an indicia registry for sight inspection of the level of liquid within said vessel.

5. An apparatus as in claim 1 wherein said pressure communication of said reservoir with said vessel is conducted through a pressure conduit having one end in communication with the interior of said vessel and a second end in communication with the interior of said reservoir.

6. An apparatus as in claim 5 wherein said pressure conduit includes a pressure converter having a first chamber and a second chamber separated by a flexible impermeable member to which is affixed a piston longitudinally slidable within said chambers, said first chamber communicating with said electrical conductive manometer fluid of said reservoir and filled with a fluid inert with respect thereto, said second chamber filled with the liquid in said vessel and communicating therewith.